United States Patent
Roberge et al.

(10) Patent No.: US 7,288,164 B2
(45) Date of Patent: Oct. 30, 2007

(54) PROCESS AND APPARATUS FOR MANUFACTURING A HONEYCOMB COMPOSITE MATERIAL

(75) Inventors: Jean-Louis Roberge, Kingsey Falls (CA); Éric Chevrette, Brampton (CA); Wendy O'Callaghan, Aurora (CA); Benoît Lebeau, Drummondville (CA); André Cantin, Bethierville (CA)

(73) Assignee: Cascades Canada Inc., Kingsey Falls, QC (CA)

( * ) Notice: Subject to any disclaimer, the term of this patent is extended or adjusted under 35 U.S.C. 154(b) by 420 days.

(21) Appl. No.: 10/879,199

(22) Filed: Jun. 30, 2004

(65) Prior Publication Data

US 2006/0000547 A1    Jan. 5, 2006

(51) Int. Cl.
    *B29C 65/00*    (2006.01)
(52) U.S. Cl. ............... 156/292; 156/197; 156/269; 156/324
(58) Field of Classification Search ........... 156/182, 156/197, 250, 267, 269, 271, 292, 324; 428/116
See application file for complete search history.

(56) References Cited

U.S. PATENT DOCUMENTS

| | | | |
|---|---|---|---|
| 2,728,479 A * | 12/1955 | Wheeler | ............... 217/35 |
| 2,731,379 A * | 1/1956 | Wheeler | ............... 156/197 |
| 3,587,479 A | 6/1971 | Geschwender | |
| 3,868,297 A | 2/1975 | Jamison et al. | |
| 3,887,418 A | 6/1975 | Jurisich | |
| 3,887,419 A | 6/1975 | Geschwender | |
| 3,934,805 A * | 1/1976 | Elaschuk | ............... 248/346.4 |
| 4,902,365 A | 2/1990 | Westlake, Sr. | |
| 4,931,340 A | 6/1990 | Baba et al. | |
| 4,948,445 A | 8/1990 | Hees | |
| 5,230,291 A | 7/1993 | Juvik-Woods | |
| 5,309,690 A | 5/1994 | Symons | |
| 5,667,867 A | 9/1997 | Meier et al. | |
| 5,738,924 A | 4/1998 | Sing | |
| 5,830,548 A | 11/1998 | Andersen et al. | |
| 6,080,495 A | 6/2000 | Wright | |
| 2002/0189507 A1 | 12/2002 | Benner | |
| 2003/0019176 A1 | 1/2003 | Anderson | |
| 2003/0077410 A1 | 4/2003 | Yamaguchi et al. | |

FOREIGN PATENT DOCUMENTS

| | | |
|---|---|---|
| AU | 200041104 | 10/2000 |
| GB | 1384577 A * | 2/1975 |

(Continued)

*Primary Examiner*—Jeff H. Aftergut
*Assistant Examiner*—Daniel McNally
(74) *Attorney, Agent, or Firm*—Ogilvy Renault, LLP

(57) ABSTRACT

The present invention relates to for a continuous production of a web of a composite material. The process comprises the steps of: providing a web of honeycomb material; providing at least one web of face sheet material having a corrugated medium with at least one linerboard on at least one face thereof; carrying the web of honeycomb material and the at least one web of face sheet material along a production line; and adhesively applying the at least one web of face sheet material to one face of the honeycomb material while the honeycomb material is being conveyed through the production line and maintained in an expanded state. The present invention also relates to a packaging material manufactured with a process described hereinabove and an apparatus to manufacture same.

10 Claims, 7 Drawing Sheets

FOREIGN PATENT DOCUMENTS

| | | |
|---|---|---|
| GB | 2213462 | 8/1989 |
| JP | 401280170 | 12/1989 |
| JP | 407214711 | 8/1995 |
| JP | 408281847 | 10/1996 |
| JP | 2002067195 | 3/2002 |

* cited by examiner

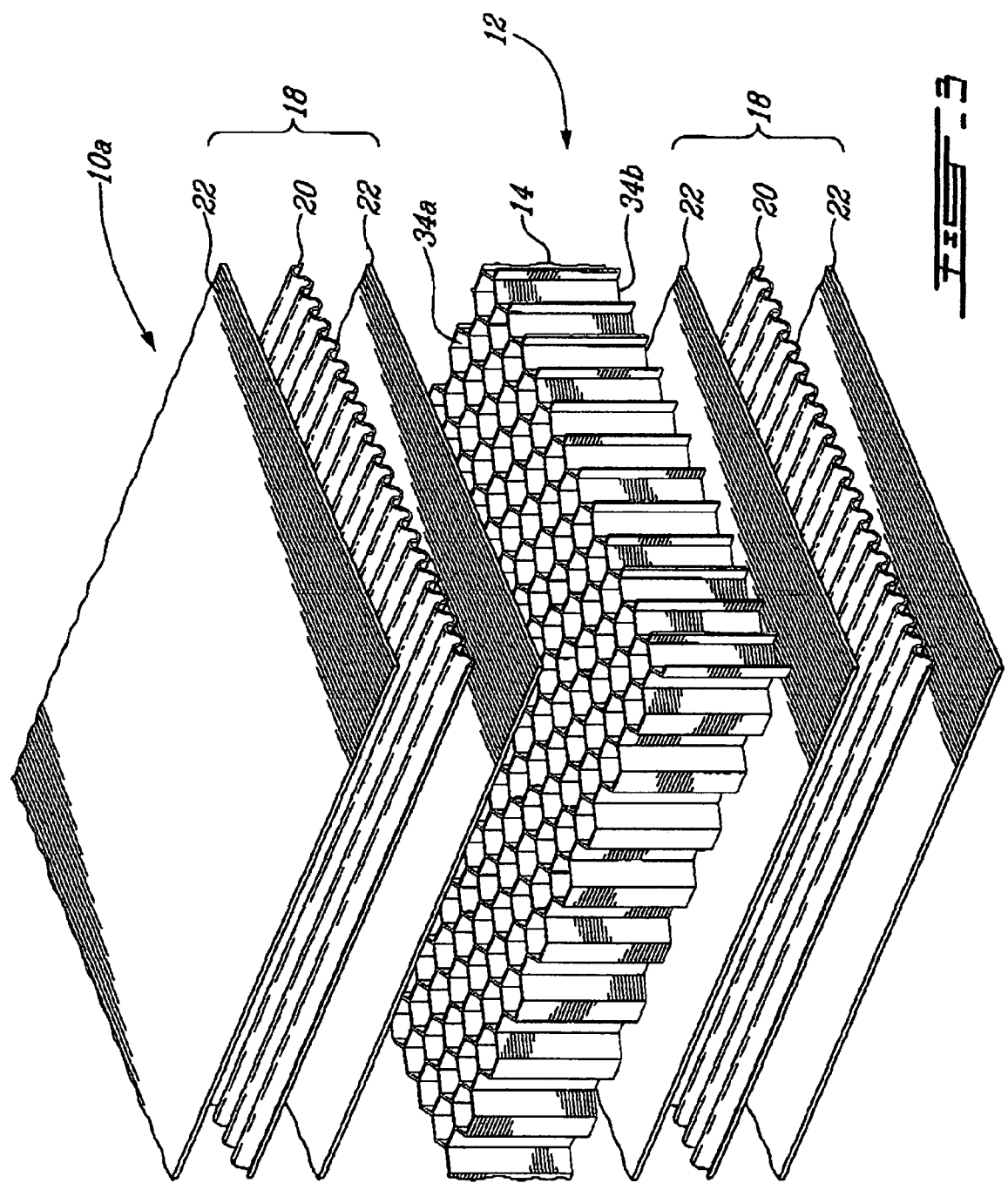

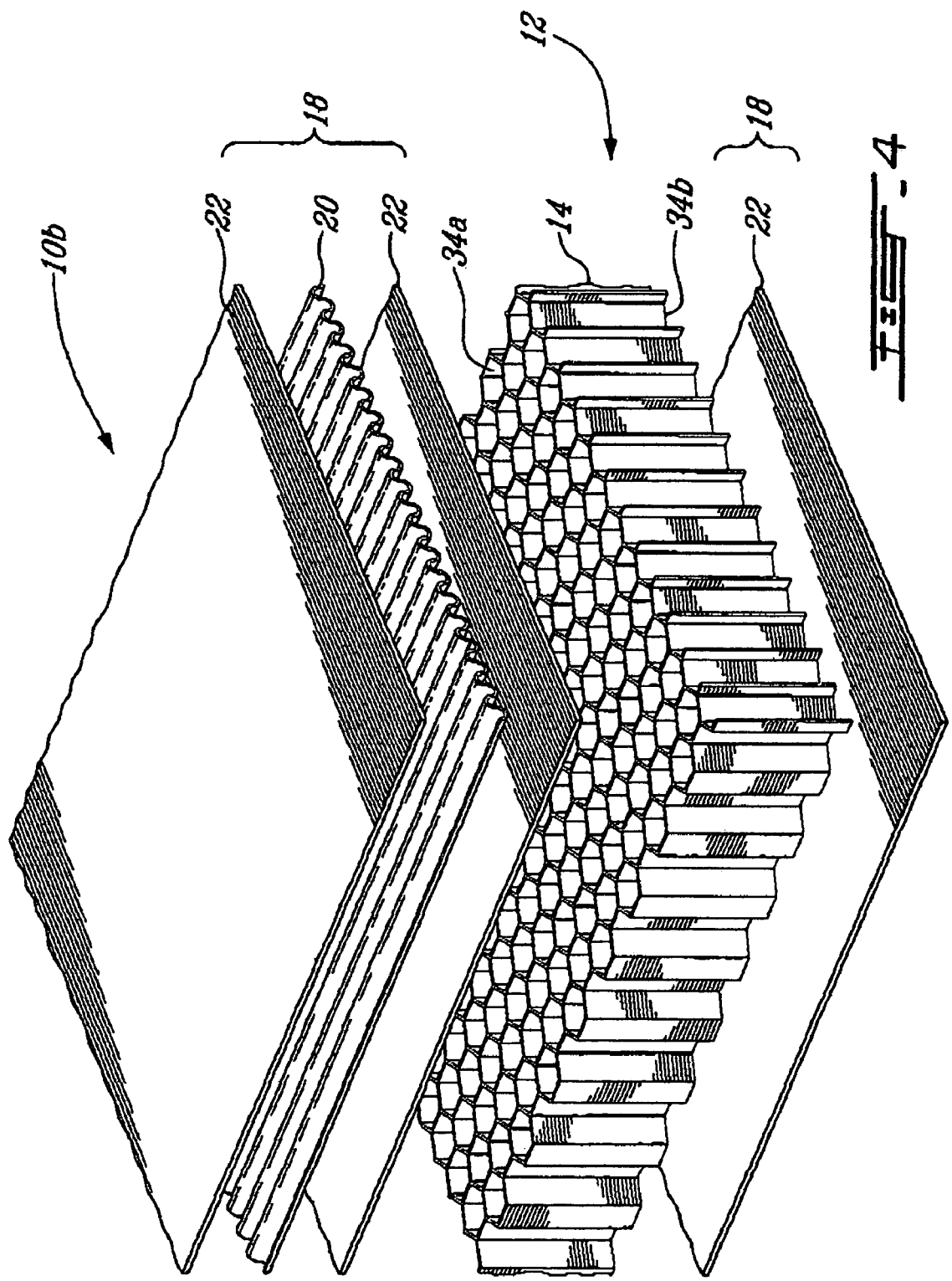

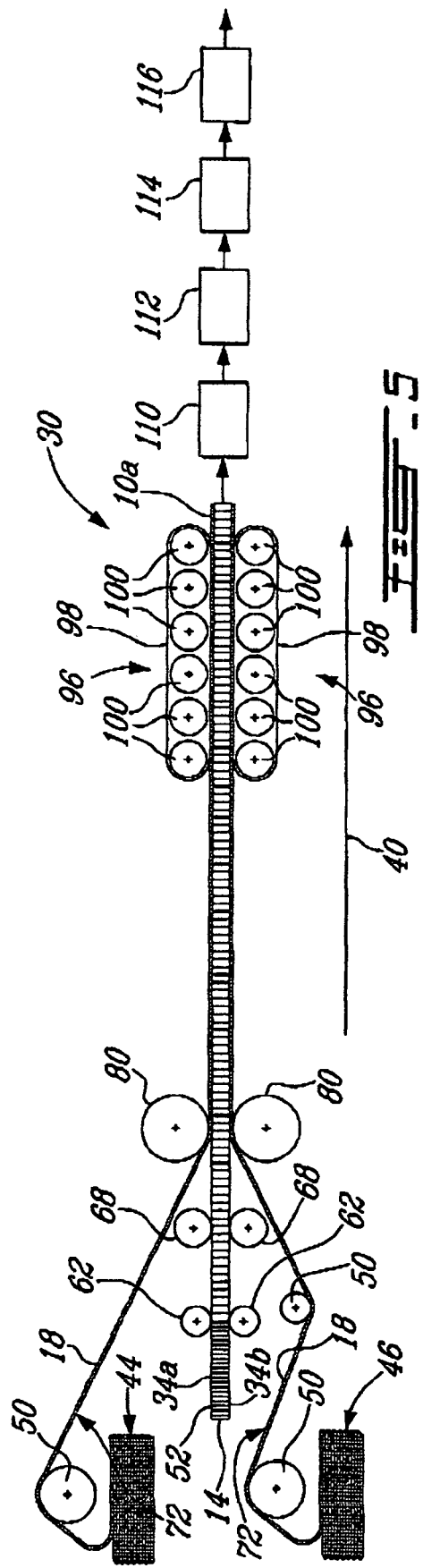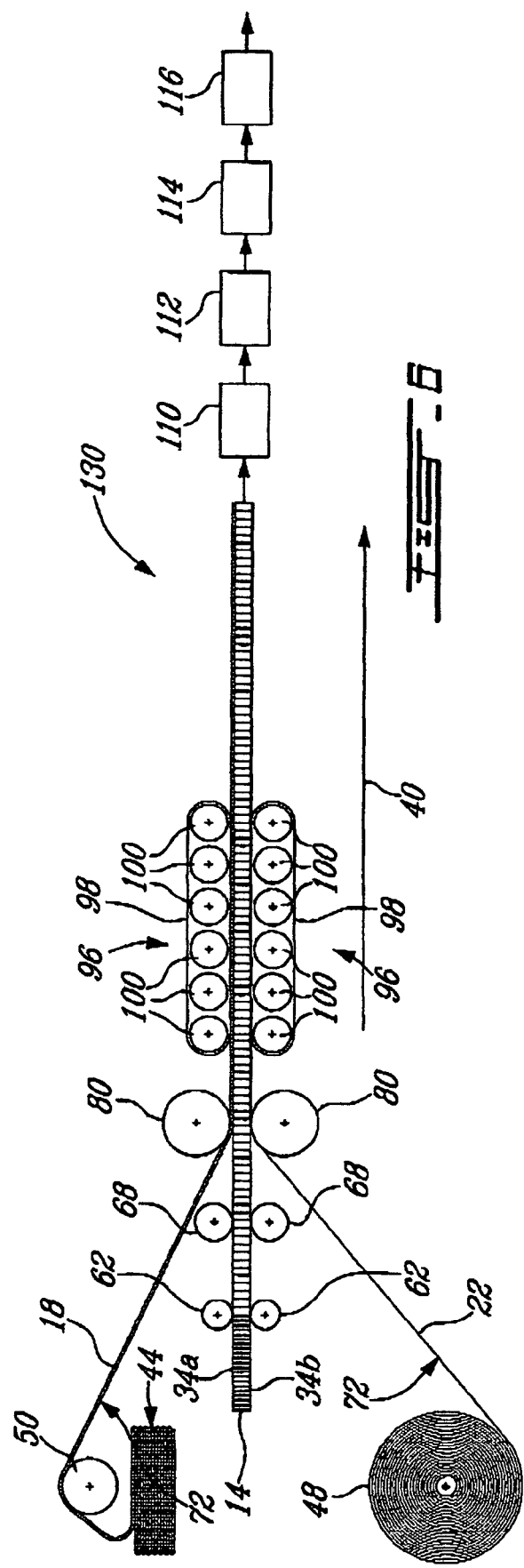

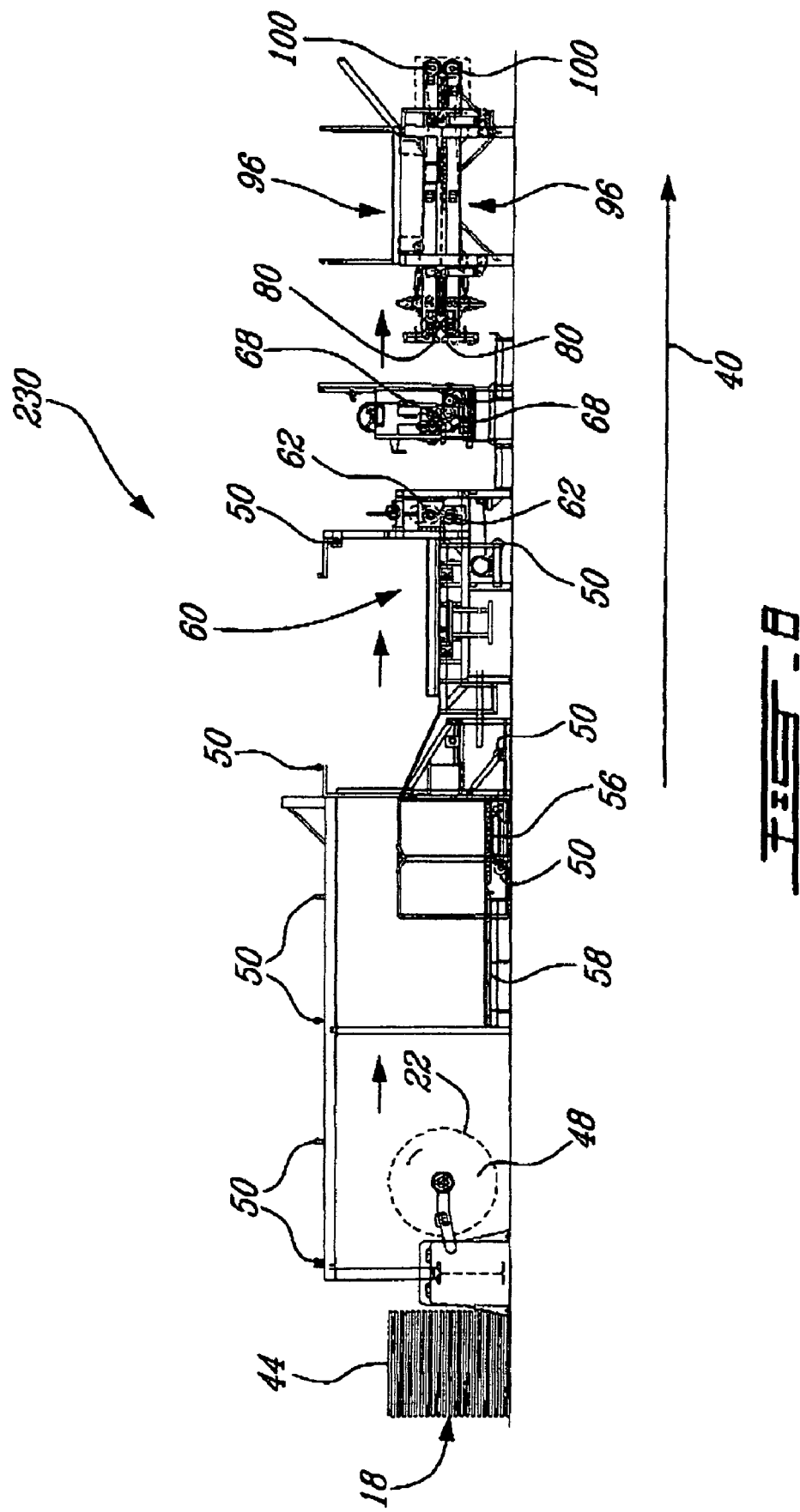

PROCESS AND APPARATUS FOR MANUFACTURING A HONEYCOMB COMPOSITE MATERIAL

FIELD OF THE INVENTION

The present invention relates to the field of manufacturing a composite material and, more particularly, to a process for manufacturing a honeycomb composite material and an apparatus to manufacture same. The composite material can be used for packaging and building applications.

BACKGROUND OF THE INVENTION

Safe product delivery requires a strong and efficient packaging material which can hold up under tough conditions. For the selection of a packaging material, the important criteria are its weight, its recyclability, its mechanical properties, and its cost.

Foam materials are widely used since they are inexpensive and lightweight. However most of them are not environmentally friendly and sometimes foam materials can generate static electricity when in contact with another object. Paper honeycomb materials are fully recyclable, lightweight, and inexpensive. Honeycomb materials probably offer the best strength to weight ratio of any material available. However, they do not offer a good compressive strength in the plane of the material (edge compression resistance). Corrugated cardboards are also fully recyclable, lightweight, and inexpensive. However, important quantities of material are necessary to produce safe containers with corrugated cardboard, which increase the packaging cost. Moreover, corrugated cardboard having anti-static electricity properties can be obtained.

Massive applications of the packaging materials require cost efficient and continuous productions to be competitive with the existing products. Furthermore, better mechanical properties to allow weight and raw material cost savings are essential for packaging applications.

SUMMARY OF THE INVENTION

It is an object of the present invention to provide a process to manufacture a honeycomb composite material that is lightweight, inexpensive, has high mechanical properties, and is preferably recyclable.

It is another object of the present invention to provide a manufacturing process for a lightweight composite material that has high mechanical properties.

It is a further object of the present invention to provide an apparatus for continuous production of a lightweight composite material.

According to one aspect of the present invention, there is provided a process for a continuous production of a web of a composite material. The process comprises the steps of: providing a web of honeycomb material; providing at least one web of face sheet material having a corrugated medium with at least one linerboard on at least one face thereof; carrying said web of honeycomb material and said at least one web of face sheet material along a production line; and adhesively applying said at least one web of face sheet material to one face of said honeycomb material while said honeycomb material is being conveyed through the production line and maintained in an expanded state; wherein the step of providing the at least one web of face sheet material further includes providing the face sheet material in a stack and unfolding the stacked face sheet material into the at least one web.

According to another aspect of the present invention, there is provided a packaging material manufactured with the process described hereinabove.

According to a further aspect of the present invention, there is provided an apparatus for a continuous production of a web of a composite material. The apparatus comprises at least one carrier for moving a web of honeycomb material along the apparatus; at least one carrier for moving at least one web of a face sheet material along the apparatus, the face sheet material having a corrugated medium with a linerboard on at least one face thereof; at least one laminator for adhesively applying the at least one web of the face sheet material to a face of the web of honeycomb material in an expanded state.

According to another aspect of the present invention, there is provided a packaging material manufactured with the apparatus described hereinabove.

The term paper is herein intended to means any wood fiber based materials such as cardboard, kraft paper, recycled paper, medium, chipboard, bleached or not, and the like.

BRIEF DESCRIPTION OF THE DRAWINGS

Further features and advantages of the present invention will become apparent from the following detailed description, taken in combination with the appended drawings, in which:

FIG. 3 is an exploded perspective view of a composite material manufactured with a process according to an embodiment of the present invention;

FIG. 4 is an exploded perspective view of a composite material manufactured with a process according to another embodiment of the present invention, the composite material has only one face sheet including a corrugated medium;

FIG. 5 is a schematic view of a process according to a first embodiment of the present invention, wherein the process is used to manufacture the composite material of FIG. 3;

FIG. 6 is a schematic view of a process according to a second embodiment of the present invention, wherein the process is used to manufacture the composite material of FIG. 4 and the face sheets are bonded to a core portion with a hot melt adhesive;

FIG. 8 is a side elevation view of the apparatus of FIG. 7 according to the present invention.

It will be noted that throughout the appended drawings, like features are identified by like reference numerals.

DETAILED DESCRIPTION OF THE PREFERRED EMBODIMENT

Figure 1:
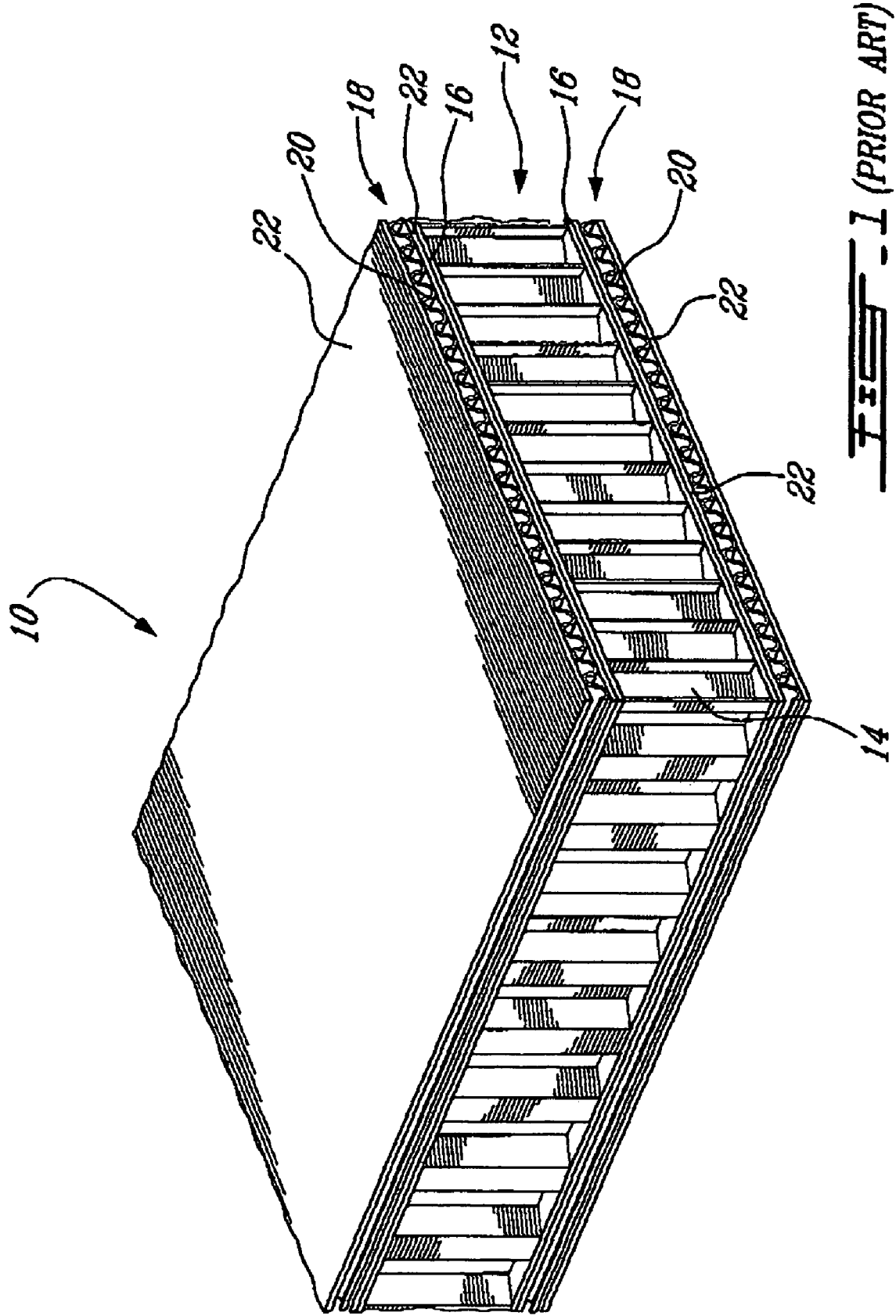
FIG. 1 is a perspective view of a composite material according to the prior art, the composite material is manufactured manually.
Figure 2:
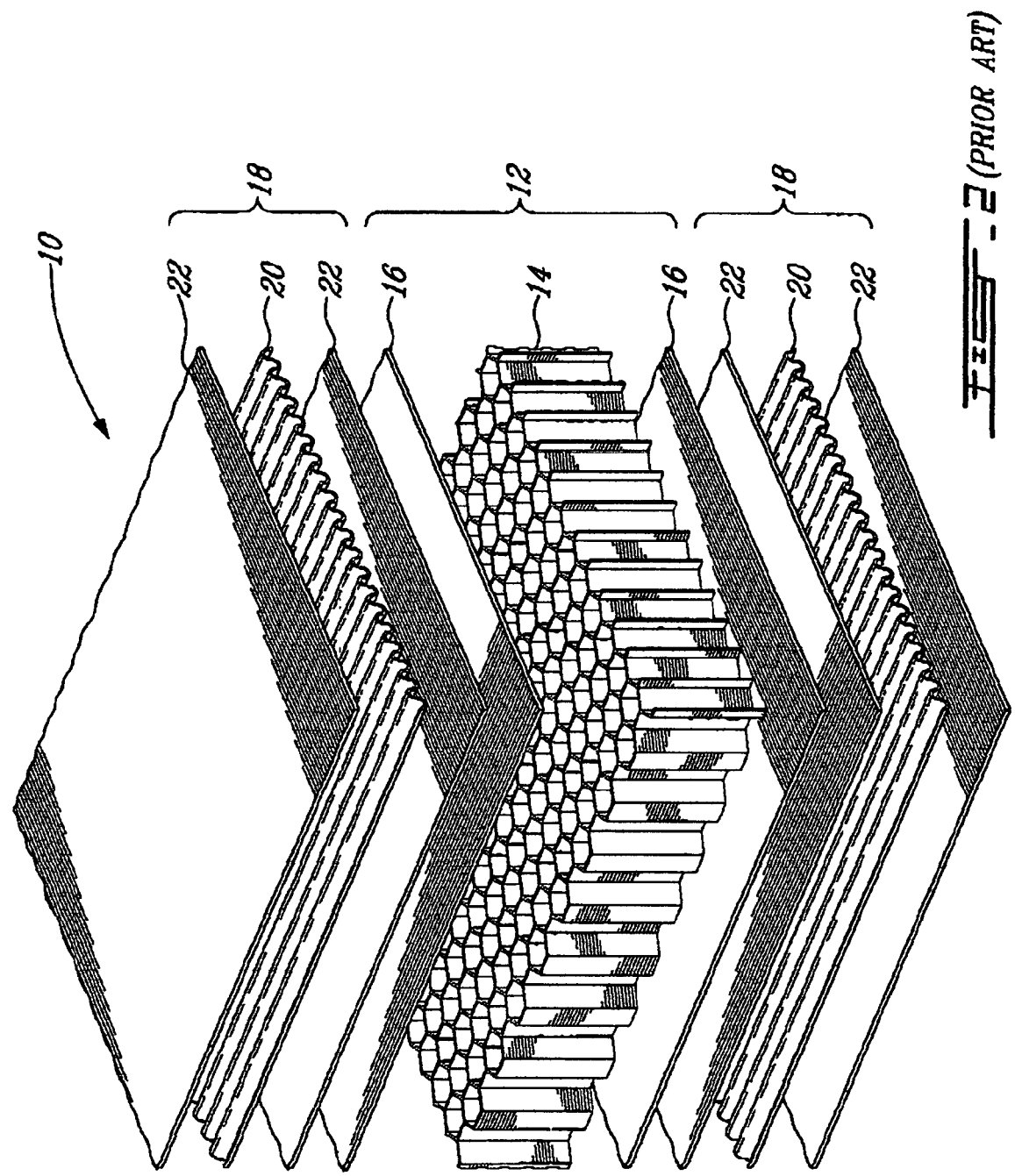
FIG. 2 is an exploded perspective view of the composite material of FIG. 1.

Referring simultaneously to FIGS. 1 and 2, there is shown a composite material 10 of the prior art typically used in packaging applications. The composite material 10 has a core portion 12 including an expanded honeycomb material 14 and two linerboards 16 laminated on the honeycomb material 14. The linerboards 16 are usually compulsory to maintain the honeycomb material 14 in an expanded state. On each linerboard 16, a face sheet 18 is manually laminated. The face sheet 18 is constituted of a corrugated medium 20 and two linerboards 22 laminated on each side of the corrugated medium 20. The composite material 10 has adequate mechanical properties for packaging applications. However, since the face sheets 18 are laminated manually on the core portion 12, it cannot be used widely due to its high manufacturing cost.

It is highly desirable to produce in a continuous manner a composite material such as the composite material described hereinabove, to reduce the manufacturing costs. Moreover, it is also desirable to reduce the raw material necessary to produce the composite material. When the composite material 10 is manufactured manually, two linerboards 16, 22 are contiguous on each side of the honeycomb material 14. As mentioned earlier, the linerboards 16 are necessary to maintain the honeycomb material 14 in an expanded state.

The present invention provides an apparatus to continuously manufacture a composite material similar to the composite material 10 and, preferably, without the double linerboards 16, 22 on each side of the honeycomb material 14.

Referring to FIG. 3, there is shown a composite material 10a manufactured by a production line 30 (or a process line) (FIG. 5). As the composite material 10, the composite material 10a has a core portion 12 and two face sheets 18 laminated on the core portion 12. The core portion 12 solely includes a honeycomb material 14 in an expanded state. As opposed to the prior art (FIGS. 1 and 2), it does not include linerboards 16 laminated on each side of the honeycomb material 14. The core portion 12 has two faces 34a, 34b. The cells of the honeycomb material 14 have an hexagonal shape but any other nested shape can be used. Each face sheet 18 is constituted of a corrugated medium 20 and two linerboards 22 laminated on each side of the corrugated medium 18. Each face sheet 18 is preferably directly laminated on the honeycomb material 14 forming the core portion 12 thereby reducing the raw material necessary to manufacture the composite material 10a.

One skilled in the art will understand that the face sheets 18 can include only one linerboard 22 laminated on one side of the corrugated medium 20. In that case, either the corrugated medium 20 or the linerboard 22 can be laminated on the core portion 12. Referring to FIG. 4, it will be seen that the composite material 10b can also have only one face sheet 18 with a corrugated medium 20 laminated on one face 34a of the core portion 12 without departing from the scope of the invention. The other face 34b of the core portion 12 can be covered with a linerboard 22 as shown in FIG. 4 or it can be uncovered.

As mentioned earlier, massive application of the honeycomb composite material requires a cost efficient and continuous production, especially for packaging applications to be competitive with the existing products.

Referring to FIG. 5, there is shown a production line 30 used to manufacture the composite material 10a (FIG. 3). The production line 30 has a longitudinal axis 40 and a transversal axis 42 (FIG. 7) which correspond to the longitudinal and transversal axis of the composite material 10a manufactured. The faces sheets 18 are provided in webs. Two stacks 44, 46 of face sheet webs are provided, each face sheet 18 including a corrugated medium 20 and two linerboards 22 laminated on each side of the corrugated medium 20. If the face sheets 18 are constituted of a corrugated medium 20 and one linerboard 22 laminated on one side of the corrugated medium 20, the face sheets 18 are preferably provided in rolls (not shown). Moreover, if the composite material 10a includes only one face sheet 18 including the corrugated medium 20, the production line 30 has only one stack 44 or roll. If the core portion 12 of the composite material 10a has one face 34a covered with a face sheet 18 including the corrugated medium 20 and the other face 34b is covered with a linerboard 22, a roll 48 (FIG. 6) of linerboard 22 is provided instead of a second stack 46 of face sheet 18.

The production line 30 is continuously fed in face sheets 18 since the face sheets are provided in webs. A new roll or stack 44, 46 is supplied to the production line 30 when the face sheet web 18 of a previous roll or stack 44, 46 has been totally consumed. The face sheets 18 are carried along the production line 30 with carriers such as driven rolls, as it will be more described in details later.

The honeycomb material 14 is provided in a collapsed state to form the core portion 12. The honeycomb material 14 is previously manufactured with a technology known by those skilled in the art. For example, collapsed blocks 52 of honeycomb material 14 are obtained by printing glue lines on a plurality of flat sheets (not shown). A stack of these sheets is made, the glue is cured, and slices are cut from these blocks 52. To expand the honeycomb material 14, the sheets are pulled apart in the direction perpendicular to the planes of the constituent strips, i.e. in the expansion direction, thus expanding into an open cellular state having, usually, an hexagonal cell configuration. However, for the production line 30, the honeycomb material 14 is provided in a collapsed state since it does not have linerboards 16 laminated thereon to maintain it in the expanded state. Webs of honeycomb material 14 are continuously supplied to the production line 30.

Figure 7:
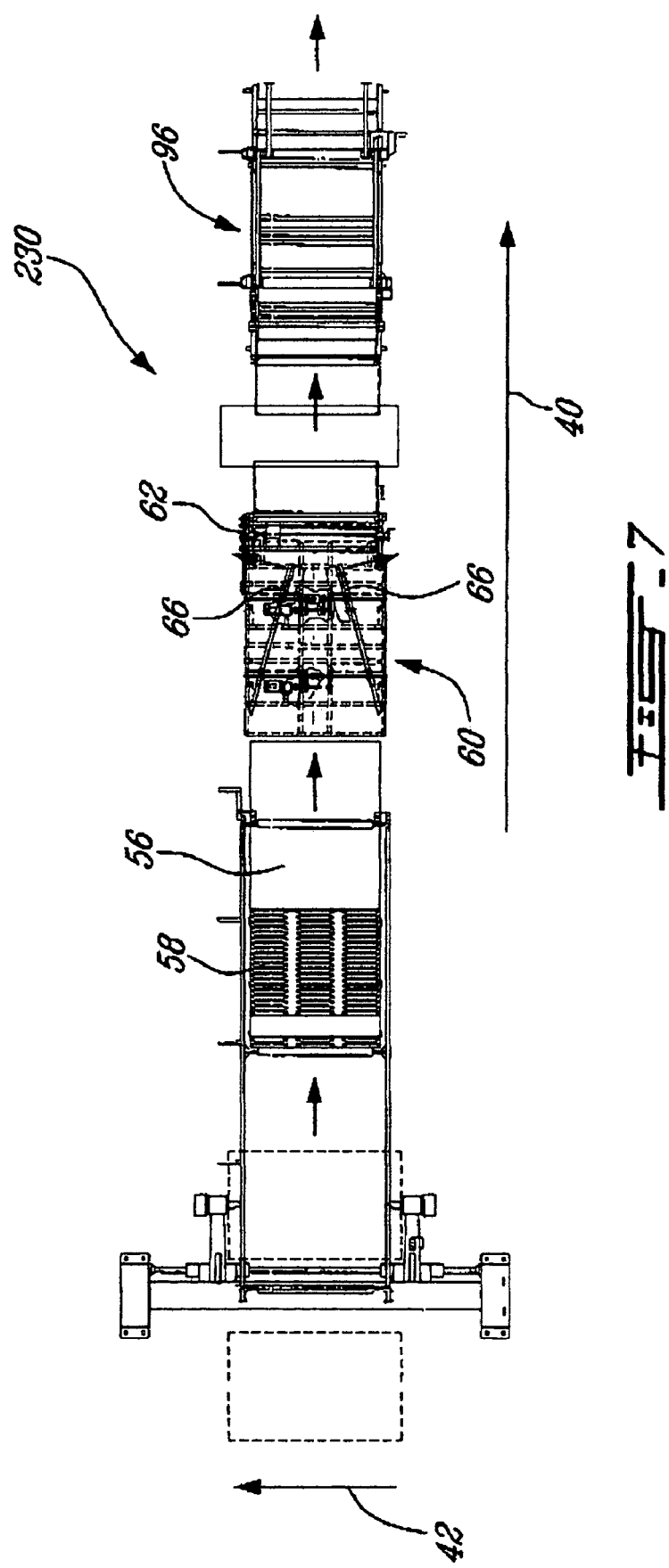
FIG. 7 is a top plan view of an apparatus according to an embodiment of the present invention, the apparatus is used to carry out the composite material of FIG. 4 with the process of FIG. 6.

The web of honeycomb material 14 is provided in the collapsed state on pallets (not shown). The pallets carrying honeycomb material 14 are conveyed toward an hydraulic table 56 (FIGS. 7 and 8) with a conveyor 58 (FIGS. 7 and 8). The hydraulic table 56 moves vertically to adjust the height of the pallet. Furthermore, the hydraulic table 56 can tilt to a predetermined angle to facilitate the expansion of the honeycomb material 14. In a preferred embodiment, the hydraulic table 56 is tilted to a 30-degree angle.

The honeycomb material 14 is then expanded on an expanding table 60 (FIGS. 7 and 8). The expanding table 60 is equipped with two expanding rolls 62, which are preferably scored. Expanding rolls 62 are disposed on each side of the honeycomb material 14. The height of the expanding rolls 62 can be adjusted according to the thickness of the honeycomb material 14. The expanding table 60 also includes two curved guides 66 (FIG. 7). While going through the curved guides 66, the width of the honeycomb material 14 is reduced and, in combination with the expanding rolls 62, the honeycomb material 14 is expanded. The expanding rolls 62 draw and expand to a predetermined degree the collapsed honeycomb material 14. The expanding rolls 62 are preferably driven rolls and carry the web of honeycomb material 30 along the production line 30. Expanding rolls 62 also supply the expanded honeycomb material 14 to a pair of adhesive rolls 68 disposed on each side of the honeycomb material 14.

The expanded honeycomb material 14 is then introduced between the two adhesive rolls 68 where an adhesive is applied on both faces 34a, 34b of the expanded honeycomb material 14. Each adhesive roll 68 is continuously supplied in the adhesive to apply homogeneously a predetermined quantity of adhesive on each face 34a, 34b of the honeycomb material 14. Any other technique known by those skilled in the art can be used to apply the adhesive on the faces 34a, 34b of the honeycomb material 14. If the composite material 10*a* includes only one face sheet 18, the adhesive is applied on only one face 34*a* of the expanded honeycomb material 14 and the face sheet 18 is applied on the face 34*a* wherein the adhesive has previously been applied. Moreover, one skilled in the art will appreciate that the adhesive can be applied on a face 22 of the face sheets 18, the face 22 that is in contact with the honeycomb material 14, without departing from the scope of the invention. However, in that case, the quantity of adhesive required to bond the face sheets 18 on the core portion 12 is more important.

The adhesive rolls 68 can be driven rolls to carry the web of honeycomb material 14 or the web of face sheets 18 along the production line 30.

Both face sheets 18 are carried close to the honeycomb material 14 after adhesive rolls 68, one face sheet 18 on each side of the honeycomb material 14. The face sheets 18 circulate parallel to the honeycomb material 14. The face sheets 18 are carried along with a plurality of rolls 50 disposed at various positions (only one is shown). Some of the rolls 50 can be driven rolls.

The face sheets 18 are laminated on the honeycomb material 14 with two insertion rolls 80, one roll 80 disposed on each side of the honeycomb material 14. As it is seen in FIG. 5, each face sheet 18 is inserted between the insertion roll 80 and the honeycomb material 14. The insertion roll 80 applies a slight pressure on the face sheet 18 and the honeycomb material 14 to create a link between both and produce the composite material 10*a* without excessively compressing any of them. Insertion rolls 80 can also be driven rolls to carry the web of composite material 10*a* along the production line 30.

The composite material 10*a* can then circulate between two heating plates (not shown) wherein the adhesive is heated to activate its adhesive properties. For example, for PVA, the adhesive is heated to approximately 215° C. One heating plate can be disposed on each side of the composite material 10*a*. One skilled in the art will appreciate that the heating plates can be replaced by several heating systems and apparatus such as electric plates, steam plates, gas or electric infrared heaters, microwaves, and a warm air flow.

Thereafter, the composite material 10*a* goes between two compression conveyors 96 wherein the honeycomb material 14 and the face sheets 18 are maintained together permitting the adhesive to set. The composite material 10*a* is maintained in the compression conveyors 96 until the adhesive is sufficiently dried and an adequate bond is formed between honeycomb material 14 and face sheets 18. One compression conveyor 96 disposed on each side of the composite material 10*a*. Each compression conveyor 96 has a rubber endless belt 98 mounted over a plurality of rolls 100. The width of the compression conveyors 96 is preferably at least equal to the width of the composite material 10*a* and they are sufficiently long to permit to the adhesive to set. The pressure applied by both two compression conveyors 96 is small in order to provide a composite material 10*a* with a honeycomb material 14 that has not been excessively compressed. However, it is sufficient to maintain both face sheets 18 in continuous contact with the honeycomb material 14 to ensure an adequate adhesion of the composite material 10*a*. The compression conveyors can also be carriers that carries the web of composite material 10*a* along the production line 30.

One skilled in the art will appreciate that even if the compression conveyors 96 are used to maintain the honeycomb material 14 in contact with the face sheets 18, any other appropriate system can be used such as flat presses or a plurality of rolls disposed on each side of the composite material 10*a*. The system used to maintain the composite material 10*a* together until the adhesive is set can be cooled down to accelerate the adhesive setting. Infrareds can also be used to accelerate the adhesive setting.

Thereafter, the composite material 10*a* is sent to a trim cutter unit 110 wherein the trims of the composite material 10*a* are cut to obtain a composite material 10*a* having a predetermined width. It is followed with a longitudinal cutter unit 112 wherein the composite material 10*a* manufactured is cut longitudinally. If desired, it is also possible to cut grooves on-line to facilitate the folding of the composite material 10*a*. In a groove cutter unit 114, a saw (not shown) cuts one face sheet 18 along a predetermined length and a wheel (not shown) is used to bend the composite material 10*a* at a predetermined angle, for instance 90°. It is followed with a transversal cutter unit 116 wherein pieces of the composite material 10*a* having a predetermined length are produced by cutting transversally the composite material 10*a* manufactured. As one skilled in the art will appreciate, the composite material 10*a* can be cut on-line or off-line and the order of the cutting operations (trim cutter unit 110, longitudinal cutter unit 112, groove cutter unit 114, and transversal cutter unit 116) can be interchanged.

Referring to FIG. 6, it will be seen another embodiment of a production line 130 used to manufacture the composite material 10*b* (FIG. 4) with a hot-melt adhesive process. A stack 44 of face sheet 18, having a corrugated medium 20 and two linerboards 22 laminated on each side of the corrugated medium 20, is provided to cover a first face 34*a* of the honeycomb material 14. A roll 48 of linerboard 22 is also provided to cover the opposite face 34*b* of the honeycomb material 14. As for the production line 30 (FIG. 5), the face sheet 18 and the linerboard 22 are fed to the production line 130 with driven rolls. Each of the face sheet 18 and the linerboard 22 are provided on one particular side of the honeycomb material 14. The honeycomb material 14 is provided In a collapsed state to form the core portion 12. The honeycomb material 14 is supplied, expanded, and the adhesive is applied in a similar manner than for the production line 30. However, the adhesive applied is an hot melt adhesive that does not need to be activated with heat to have adhesive properties. The hot melt adhesive is applied on both faces 34*a*, 34*b* of the expanded honeycomb material 14. The face sheet 18 and the linerboard 22 are applied on the expanded honeycomb material 14 similarly as for the production line 30 of FIG. 5. Two compression conveyors 96 are used to maintain the face sheet 18 and the linerboard 22 in contact with the honeycomb material 14 during only few seconds since the hot melt adhesive dries rapidly. Therefore, the length of the compression conveyors 96 of production line 130 is shorter than the length of the compression conveyors 96 of production line 30.

Thereafter, the composite material 10*b* is sent to trim cutter unit 110, followed with the longitudinal cutter unit 112, and the groove cutter unit 114 where a saw cuts the face sheet 18 along a predetermined length and a wheel is used to bend the composite material 10*b* at a predetermined angle, for instance 90°. Finally, the composite material 10*b* is sent to the transversal cutter unit 116. As mentioned earlier, one skilled in the art will appreciate that the composite material 10*a* can be cut on-line or off-line and the order of the cutting operations (trim cutter unit 110, longitudinal cutter unit 112, groove cutter unit 114, and transversal cutter unit 116) can be interchanged.

Referring simultaneously to FIGS. 7 and 8, there is shown an apparatus 230 for manufacturing the composite material 10b (FIG. 4) with the production line 30. A stack 44 of face sheet 18, having a corrugated medium 20 and two linerboards 22 laminated on each side of the corrugated medium 20, is provided to cover a first face 34a of the honeycomb material. A roll 48 of linerboard 22 is also provided to cover the opposite face 34b of the honeycomb material (not shown). The face sheet 18 and the linerboard 22 are fed to the production line 30 with driven rolls. Each of the face sheet 18 and the linerboard 22 are provided on one particular side of the honeycomb material.

As for the production lines 30 and 130, the honeycomb material is provided in the collapsed state on pallets that are conveyed toward the hydraulic table 56 with the conveyor 58. The honeycomb material is then expanded on the expanding table 60. The expanding table 60 is equipped with two expanding rolls 62 disposed on each side of the honeycomb material and two curved guides 66. The expanding table 60 draws and expands to a predetermined degree the collapsed honeycomb material. Expanding rolls 62 also supply the expanded honeycomb material to a pair of adhesive rolls 68 disposed on each side of the honeycomb material. The adhesive rolls 68 apply the adhesive on both faces 34a, 34b of the expanded honeycomb material.

The face sheet 18 and the linerboard 22 are carried close to the honeycomb material after adhesive rolls 68. The face sheet 18 and the linerboard 22 circulate parallel to the honeycomb material. The face sheet 18 and the linerboard 22 are carried along with a plurality of rolls 50 disposed at various positions (only one is shown). Some of the rolls 50 can be driven rolls.

The face sheet 18 and the linerboard 22 are laminated on the honeycomb material with two Insertion rolls 80, one roll 80 disposed on each side of the honeycomb material. As it is seen in FIG. 5, the face sheet 18 and the linerboard 22 are inserted between a respective insertion roll 80 and the honeycomb material 14. The composite material 10a can then circulate between two heating plates wherein the adhesive is heated to activate its adhesive properties.

Thereafter, the composite material 10a goes between two compression conveyors 96 wherein the honeycomb material and the face sheets 18 are maintained together permitting the adhesive to set. One compression conveyor 96 disposed on each side of the composite material 10a. Each compression conveyor 96 has a rubber endless belt 98 mounted over a plurality of rolls 100. Then, the composite material 10b is sent to cutter units (not shown) described above.

The honeycomb material 14 can be corrugated honeycomb without departing from the scope of the invention. Furthermore, one skilled in the art will understand that the adhesive can be applied on the face sheets 18 without departing from the scope of the invention.

The composite material produced with either the hot melt production line 130 or the conventional production line 30 can consist in any combination of at least one face sheet 18 having at least one corrugated medium 20 laminated on a honeycomb material 14.

One skilled in the art will understand that any number of linerboards 16, 22 or face sheets 18 can be laminated on the composite material 10a, 10b without departing from the scope of the invention.

The composite material 10a, 10b can be used for packaging applications wherein at least a portion of a container as shown in FIG. 7 is made of the composite material 10a, 10b.

The core portion 12, the face sheets 18, and the linerboard 22 are preferably made from material which may be readily recycled using commercially available technology such as wood fiber based materials (cardboard, kraft paper, recycled paper, medium, chipboard, bleached or not, and the like). The material can be impregnated with a resin to improve its resistance to water, grease or fire, its gas and vapor barrier properties, its non-slip properties, and the like.

The choice of the adhesive to join together the various components of the composite material 10a, 10b can also be made on the basis of recyclability. The adhesive must ensure a good adhesion of the core portion 12 and the face sheets 18 or the linerboard 22, remain on the top of the honeycomb material, and bond very rapidly. Adhesives such as polyvinyl alcohol (PVA), stamp glue, dextrin, and polyurethane can be used to assembly the composite material 10. Hot melt adhesives such as polyolefin and ethylene vinyl acetate (EVA) can also be used.

Preferably, the composite material is wholly recyclable. It can be used as a packaging material due to its high strength for resisting stresses and strains.

The embodiments of the invention described above are intended to be exemplary only. For example, a portion or the entirety of the wood fiber based materials forming the composite material can be covered with a metallic foil, such as an aluminum foil, or a polymer, such as polyethylene. The composite material can be used in building applications such as for walls, doors, tableaux, etc. The scope of the invention is therefore intended to be limited solely by the scope of the appended claims.

We claim:

1. A process for a continuous production of a web of a composite material, the process comprising the steps of:
   providing a web of honeycomb material;
   providing at least one web of face sheet material having a corrugated medium with at least one linerboard on at least one face thereof;
   carrying said web of honeycomb material and said at least one web of face sheet material along a production line; and
   adhesively applying said at least one web of face sheet material to one face of said honeycomb material while said honeycomb material is being conveyed through the production line and maintained in an expanded state;
   wherein the step of providing the at least one web of face sheet material further includes providing the face sheet material in a stack and unfolding the stacked face sheet material into the at least one web.

2. A process as claimed in claim 1, further comprising the step of expanding said honeycomb material from a collapsed state to said expanded state while said honeycomb material is being conveyed through the production line.

3. A process as claimed in claim 1, wherein the step of adhesively applying said at least one web of face sheet material to one face of said honeycomb material further comprises
   applying an adhesive on one of at least one face of said web of honeycomb material and a face of each of said at least one web of face sheet material;
   laminating said at least one web of face sheet material on said web of honeycomb material, said adhesive being located therebetween; and
   permitting said adhesive to set to keep said at least one web of face sheet material laminated with said web of honeycomb material.

4. A process as claimed in claim 3, wherein said adhesive is applied on at least one face of said web of honeycomb material.

5. A process as claimed in claim 3, further comprising heating said adhesive.

6. A process as claimed in claim 1, further comprising trimming said web of composite material.

7. A process as claimed in claim 1, further comprising cutting one of said at least one face sheet material of said web of composite material and bending said web of composite material to a predetermined angle.

8. A process as claimed in claim 1, further comprising cutting longitudinally said web of composite material.

9. A process as claimed in claim 1, further comprising cutting transversally said web of composite material.

10. A process as claimed in claim 1, wherein said at least one web of face sheet material comprises a linerboard on each face of said corrugated medium.

* * * * *